US009170685B2

(12) United States Patent
Spears

(10) Patent No.: US 9,170,685 B2
(45) Date of Patent: Oct. 27, 2015

(54) OBJECT LOCATION DETERMINATION

(71) Applicant: 1 OAK TECHNOLOGIES, LLC, Fort Collins, CO (US)

(72) Inventor: Kurt E Spears, Fort Collins, CO (US)

(73) Assignee: OTTER PRODUCTS, LLC, Fort Collins, CO (US)

( * ) Notice: Subject to any disclaimer, the term of this patent is extended or adjusted under 35 U.S.C. 154(b) by 137 days.

(21) Appl. No.: 13/923,174

(22) Filed: Jun. 20, 2013

(65) Prior Publication Data

US 2014/0375613 A1    Dec. 25, 2014

(51) Int. Cl.
*G06F 3/042*    (2006.01)

(52) U.S. Cl.
CPC ............ *G06F 3/0425* (2013.01); *G06F 3/0428* (2013.01); *G06F 2203/04104* (2013.01)

(58) Field of Classification Search
None
See application file for complete search history.

(56) References Cited

U.S. PATENT DOCUMENTS

| | | |
|---|---|---|
| 3,184,847 A | 5/1965 | Rosen |
| 3,613,066 A | 10/1971 | Cooreman |
| 4,294,543 A | 10/1981 | Apple et al. |
| 4,420,261 A | 12/1983 | Barlow et al. |
| 4,553,842 A | 11/1985 | Griffin |
| 4,558,313 A | 12/1985 | Garwin et al. |
| 4,642,422 A | 2/1987 | Garwin et al. |
| 4,688,933 A | 8/1987 | Lapeyre |
| 5,196,835 A | 3/1993 | Blue et al. |
| 5,231,381 A | 7/1993 | Duwaer |
| 5,248,856 A | 9/1993 | Mallicoat |
| 5,365,461 A | 11/1994 | Stein et al. |
| 5,502,568 A * | 3/1996 | Ogawa ............... G01D 5/34 250/222.1 |
| 5,734,375 A | 3/1998 | Knox et al. |
| 5,933,812 A | 8/1999 | Meyer et al. |
| 6,091,405 A | 7/2000 | Lowe et al. |
| 6,362,468 B1 | 3/2002 | Murakami et al. |
| 6,437,314 B1 | 8/2002 | Usuda et al. |
| 6,480,187 B1 | 11/2002 | Sano et al. |
| 6,522,395 B1 * | 2/2003 | Bamji et al. ............. 356/5.01 |
| 6,603,464 B1 | 8/2003 | Rabin |
| 6,816,537 B2 | 11/2004 | Liess |
| 6,906,702 B1 | 6/2005 | Tanaka et al. |
| 7,050,048 B2 | 5/2006 | Ito |
| 7,532,206 B2 * | 5/2009 | Morrison et al. ............ 345/179 |
| 8,009,152 B2 | 8/2011 | Kim et al. |
| 8,035,612 B2 | 10/2011 | Bell et al. |
| 8,355,012 B2 | 1/2013 | Chen et al. |
| 8,373,657 B2 | 2/2013 | Hildreth |
| 8,390,718 B2 | 3/2013 | Robinson et al. |
| 8,558,804 B2 * | 10/2013 | Chen ............... G06F 3/0416 345/173 |
| 8,619,061 B2 * | 12/2013 | Yen ............... G06F 3/0428 178/18.09 |
| 8,723,789 B1 * | 5/2014 | Rafii ............... 345/156 |
| 8,797,446 B2 * | 8/2014 | Chou ............... 348/340 |

(Continued)

*Primary Examiner* — Claire X Pappas
*Assistant Examiner* — Benjamin Casarez

(57) ABSTRACT

An apparatus for determining a position of an object on a planar surface is provided. The apparatus includes a conical mirror having an axis that is perpendicular to the planar surface and a time-of-flight sensor array having a spatial relationship to the conical mirror such that a field of view of the time of flight sensor array is reflected radially from the conical mirror in a plurality of directions across the planar surface. The apparatus also includes electrical circuitry configured to receive a ranged image captured by the time-of-flight sensor array through the conical mirror, process the ranged image to determine the position of the object on the planar surface by determining an angle and a radius of the object relative to the axis of the conical mirror, and transmit the position of the object to a display system.

18 Claims, 9 Drawing Sheets

(56) References Cited

U.S. PATENT DOCUMENTS

| | | | |
|---|---|---|---|
| 2001/0022579 A1* | 9/2001 | Hirabayashi | 345/175 |
| 2002/0015159 A1* | 2/2002 | Hashimoto | 356/620 |
| 2003/0071858 A1* | 4/2003 | Morohoshi | 345/856 |
| 2006/0007123 A1* | 1/2006 | Wilson et al. | 345/156 |
| 2006/0028442 A1* | 2/2006 | Bynum et al. | 345/157 |
| 2006/0132459 A1* | 6/2006 | Huddleston et al. | 345/173 |
| 2006/0202974 A1* | 9/2006 | Thielman | G06F 3/0421 345/175 |
| 2008/0062149 A1* | 3/2008 | Baruk | 345/175 |
| 2008/0259053 A1* | 10/2008 | Newton | 345/175 |
| 2009/0276734 A1* | 11/2009 | Taylor et al. | 715/863 |
| 2010/0066704 A1 | 3/2010 | Kasai | |
| 2010/0085329 A1 | 4/2010 | Tseng et al. | |
| 2010/0090986 A1 | 4/2010 | Wang | |
| 2010/0295821 A1* | 11/2010 | Chang | G06F 3/0421 345/175 |
| 2011/0043484 A1 | 2/2011 | Huang et al. | |
| 2011/0051120 A1* | 3/2011 | Hartman et al. | 356/5.01 |
| 2011/0155479 A1* | 6/2011 | Oda et al. | 178/18.06 |
| 2011/0205340 A1 | 8/2011 | Garcia et al. | |
| 2011/0291988 A1* | 12/2011 | Bamji et al. | 345/175 |
| 2012/0056807 A1* | 3/2012 | Chapman | G06F 3/0428 345/158 |
| 2012/0062905 A1* | 3/2012 | Kiyose | 356/614 |
| 2012/0065914 A1* | 3/2012 | Kiyose | 702/95 |
| 2012/0098795 A1* | 4/2012 | Lu | G06F 3/0428 345/175 |
| 2012/0120028 A1* | 5/2012 | Kiyose | 345/175 |
| 2012/0293555 A1* | 11/2012 | Okano | G06F 3/0428 345/660 |
| 2015/0049063 A1* | 2/2015 | Smith | G06F 3/0421 345/175 |

\* cited by examiner

OBJECT LOCATION DETERMINATION

FIELD

The present application relates to apparatuses, systems, and methods for determining a location of an object on a planar surface.

BACKGROUND

Developments in technology have changed the way information is displayed and communicated to groups of people. Traditionally chalkboards and whiteboards have been used for these purposes. However, chalkboards and whiteboards have significant drawbacks. First, they cannot be easily integrated with electronic information displays. Second, they require specialized writing surfaces that are compatible with chalk, dry erase markers, or similar writing tools. Third, information written on these types of surfaces is not easily captured electronically for computerized processing or display. While some whiteboards have electronic scanning capability, electronic scanning can be costly for large whiteboards as the scanning mechanism(s) must typically span the entire whiteboard or span an entire dimension of the whiteboard and be configured for controlled mechanical movement across the other dimension of the whiteboard.

Written information is also often electronically captured using an electronic touchpad that translates motion of a stylus, a user's finger, or another pointing device into electronic information. The information is typically captured relative to a position of the stylus, pointer, or finger on a surface or on a display screen. Touchpads are commonly integrated with or overlaid on a display screen, such as on a smartphone or tablet computer. Touchpads are also sometimes implemented in or on non-display surfaces such as on a digitizing tablet for computerized drafting system. A touchpad typically allows information to be electronically captured more efficiently than other methods as the user is not required to enter the information using a traditional input device such as a keyboard or a mouse. In addition, a touchpad enables the user to provide freehand or freeform written input.

Touchpads typically sense a user's actions using one of several methods including capacitive sensing, conductance sensing, and/or using a pressure sensitive membrane. Each of these methods requires that the display surface be overlaid with electrical and/or mechanical hardware which enables the surface to become touch sensitive. The cost of adding touch sensing capability to displays increases proportionally, and in some cases exponentially, with the increasing area of the screen. In some situations, the cost increases even further due to manufacturing yield issues associated with large areas. Consequently, touch input capabilities can be prohibitively expensive as display sizes increase. For this and other reasons, large numbers of displays are sold without touch input capability. It is desirable to add touch input capabilities to these displays in a cost effective manner. In addition, it may be desirable for a user to be able to provide written input using a stylus or finger on a surface other than on a surface of a display.

SUMMARY

An apparatus for determining a position of an object on a planar surface is provided. The apparatus includes a conical mirror having an axis that is perpendicular to the planar surface and a time-of-flight (TOF) sensor array having a spatial relationship to the conical mirror such that a field of view of the TOF sensor array is reflected radially from the conical mirror in a plurality of directions across the planar surface. The apparatus also includes electrical circuitry configured to receive a ranged image captured by the TOF sensor array through the conical mirror, process the ranged image to determine the position of the object on the planar surface by determining an angle and a radius of the object relative to the axis of the conical mirror, and transmit the position of the object to a display system.

Other techniques introduced herein also include other systems, apparatuses, and methods with various components. The techniques introduced herein may also include non-transitory machine-readable storage media storing instructions that, when executed by one or more computer processors, direct the one or more computer processors to perform the methods, variations of the methods, or other operations described herein. While multiple embodiments are disclosed, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

The disclosed techniques will be described and explained through the use of the accompanying drawings in which.

DETAILED DESCRIPTION

Figure 1:
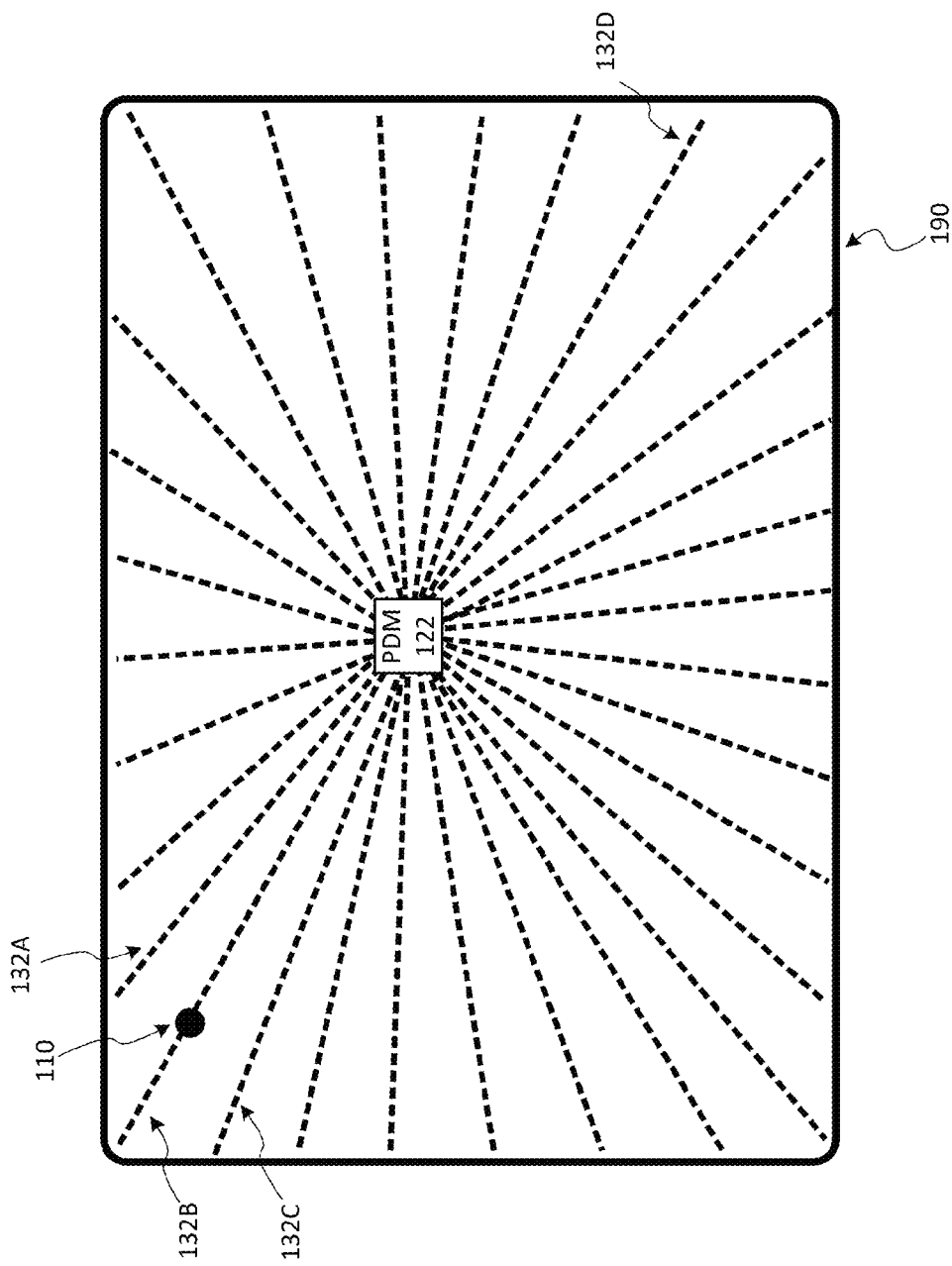
FIG. 1 illustrates operation of an apparatus for determining a location of an object on a planar surface.

In the following detailed description, various specific details are set forth in order to provide an understanding of and describe the systems, apparatuses, and techniques introduced here. However, the systems, apparatuses, and techniques may be practiced without the specific details set forth in these examples. Various alternatives, modifications, and/or equivalents will be apparent to those skilled in the art without varying from the spirit of the introduced systems, apparatuses, and techniques. For example, while the examples described herein refer to particular features, the scope of this solution also includes techniques and implementations having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Various types of electronic whiteboards and interactive displays have been developed to address the shortcomings of traditional whiteboards and chalkboards discussed above. Some of these systems use touchpads or touchscreens that span an entire display or writing area. While this approach has been widely accepted for devices such as smartphones and tablet computers having relatively small displays, touchscreens are a costly solution when a large display and/or writing area is desired. Other systems for capturing written information on a surface use a large number of sensors and/or mirrors placed around the periphery of the writing surface. This approach also has the disadvantage of being costly and is not easily adaptable to existing displays which do not have touch input capability. Other systems use one or more of various types of cameras which view the writing surface from a distance in order to capture the movements of a stylus or capture writing on the surface. In addition to requiring costly components, these systems require that some of the components be positioned a distance away from the writing surface at a location from which the writing surface can be viewed. This type of configuration requires additional space, often has more complex setup and configuration requirements, and requires a view of the writing surface that is not obstructed by users or objects.

Systems, apparatuses, methods, and techniques are introduced here that resolve the shortcomings discussed above. In one example, an apparatus for determining a location of an object on a planar surface is provided. In another example, a system for determining a location of an object on a planar surface is provided. In yet another example, a method for determining a position of an object on a planar surface is provided. Advantageously, the cost of the components required to implement the disclosed apparatuses, systems, and methods will typically be lower than in existing solutions and will require less physical space. In addition, the disclosed apparatuses, systems, and methods may be readily adapted for use with existing electronic display devices.

The examples and descriptions which follow use the term "write" and "writing" to describe motions a user makes with a stylus, finger, pointer, or other object. As used herein, the terms "write" or "writing" do not necessarily include making a physical mark on a surface or object. The "writing" may simply include physical motions which are electronically captured using the techniques described here. Using these techniques, "writing" may be performed without physically marking a surface, without using a device that is capable of physically marking a surface, and/or without using a surface that is capable of being physically marked. In addition, "writing" may represent information or communications other than words, letters, and numbers. "Writing" may include artistic representations, symbols, or other forms of information or communication that, using traditional methods, would be marked on some type of object or surface. In some examples, "writing" is electronically displayed on a display device as a representation of a physical mark even though no physical mark was made.

Furthermore, many of the techniques disclosed here are discussed in terms of determining a location of an object on a surface. It should be understood that writing or writing motion can be captured and/or approximated by determining successive locations of an object on a surface over a period of time. The successive locations represent a path of the object across the surface. The location of the object may be sampled periodically at a sufficient frequency, relative to the writing motion, to enable the writing to be approximated by interpolating and/or connecting the sampled data points.

FIG. 1 illustrates operation of position determination module (PDM) 122 for determining a location of object 110 on planar surface 190. Although the operation of PDM 122 is illustrated with respect to planar surface 190 and object 110, PDM 122 may be operated with other objects and/or surfaces. PDM 122 may be operated with respect to any "writing" surface. In some cases, PDM 122 may be operated using other types on non-traditional "writing" surfaces such as a wall, a table, a floor, a surface of an electronic display, or another planar or near-planar surface.

PDM 122 may include a TOF sensor as well as optical components that direct the field of view of PDM 122 in multiple directions across planar surface 190 as illustrated by optical paths 132A, 132B, 132C, and 132D in FIG. 1. While the optical paths 132 are illustrated as discrete optical paths for purposes of description, the field of view of PDM 122 may be spread across planar surface 190 in a continuous manner rather than being separated into discrete optical paths. In other words, the field of view illustrated by optical paths 132 in FIG. 1 may be radially continuous rather than being made up of discrete optical paths or beams as is suggested by the dashed lines. The illustration of the field of view using the dashed lines is intended to convey that the field of view of PDM 122 is optically and radially directed along the surface of planar surface 190 in a plurality of directions. The field of view may or may not span the entire area of planar surface 190. Using methods known in the optical arts, various optical components may be used to focus, collimate, limit, shape, or otherwise alter characteristics of the field of view.

PDM 122 may include a range imaging device. A range imaging device determines distances of objects in its field of view based on the speed of light by measuring the time of flight of an optical signal transmitted between a source associated with the sensor and one or more objects in the field of view of the sensor. The determination of distance is made with respect to each of multiple sensing elements which make up the range imaging device. A range imaging device captures range information, which may also be referred to as a ranged image, for the area in its field of view. Capturing a range image may include making distance determinations for the entire field of view rather than by scanning point-by-point with a beam such as in scanning lidar systems.

In one example, a TOF sensor in PDM 122 may include a plurality of sensor elements or pixels that capture light intensity information similar to methods used in charge-coupled device (CCD) imaging sensors. In some cases, the sensor elements or pixels may also capture color information. However, unlike a typical CCD sensor, the TOF sensor also captures distance information that is associated with one or more of the sensor elements or pixels. In some cases, distance information for each of the sensor elements or pixels. The TOF sensor may be sensitive to electromagnetic energy in the visible, ultraviolet, and/or infrared spectrums. In some cases, the TOF sensor obtains the distance information using a radio frequency modulated light source and a phase detector. In other cases, the distance information is obtained using a pulsed light source and a shutter synchronized with the pulsed light source. The TOF sensor may also be part of a TOF camera.

PDM 122 is illustrated as being placed at or near the center of planar surface 190. However, PDM 122 may be in another location relative to planar surface 190. Planar surface 190 may be a wall, a floor, a desktop, a surface of an electronic display, or any other surface that is planar. However, planar surface 190 does not need to be entirely planar or smooth. It is only necessary that TOF sensor 122 have a view across the surface of planar surface 190 and near the surface of planar surface 190 without being significantly obstructed by variations in planar surface 190, as is discussed in more detail below. The field of view of PDM 122 may be reflected across planar surface 190 in all directions or may be reflected across only a portion or portions of planar surface 190.

In addition to a TOF sensor array, PDM 122 may also contain electrical and/or electronic components. The electrical circuitry may include digital components, analog components, electromechanical connecting components, or a combination thereof. In some cases, the electrical circuitry may include one or more computer processors, microcontrollers, digital signal processors, programmable logic arrays, and/or programmable logic devices. In some cases, the electrical circuitry may also contain firmware, software, and/or another type of machine-readable instruction executable by the electrical hardware. PDM 122 may also include components configured for communicating with one or more other devices through a wired connection, through a wireless connection, or through a combination thereof.

Object 110 is any object that a user may use to make pointing or writing motions on planar surface 190. Object 110 may be a finger, a stylus, a pointer, a pen, a marker, or another object having a tip or end discernible in images or image information captured by PDM 122.

Using the techniques described herein, a location of object 110 on planar surface 190 can be determined relative to the location of PDM 122. PDM 122 captures an image, including range information, that includes object 110. Object 110 is included in the portion of the field of view associated with optical path 132B. In other words, PDM 122 effectively captures a panoramic range image across the surface of planar surface 190.

PDM 122 does not need to be attached to planar surface 190 and may be optionally moved between surfaces or may simply be set on a surface temporarily to be used with that surface. For example, PDM 122 could be set on a floor and used to track locations of objects or footsteps on the floor. PDM 122 may also be used with a vertical surface or a surface at any other angle. Successive locations of object 110 on planar surface 190 may be determined in order to identify a path of object 110 as it moves across planar surface 190. The calculations described herein related to distances, locations, and corrections for optical characteristics may be performed by PDM 122, may be performed by another device, or may be performed by a combination thereof.

Figure 2:
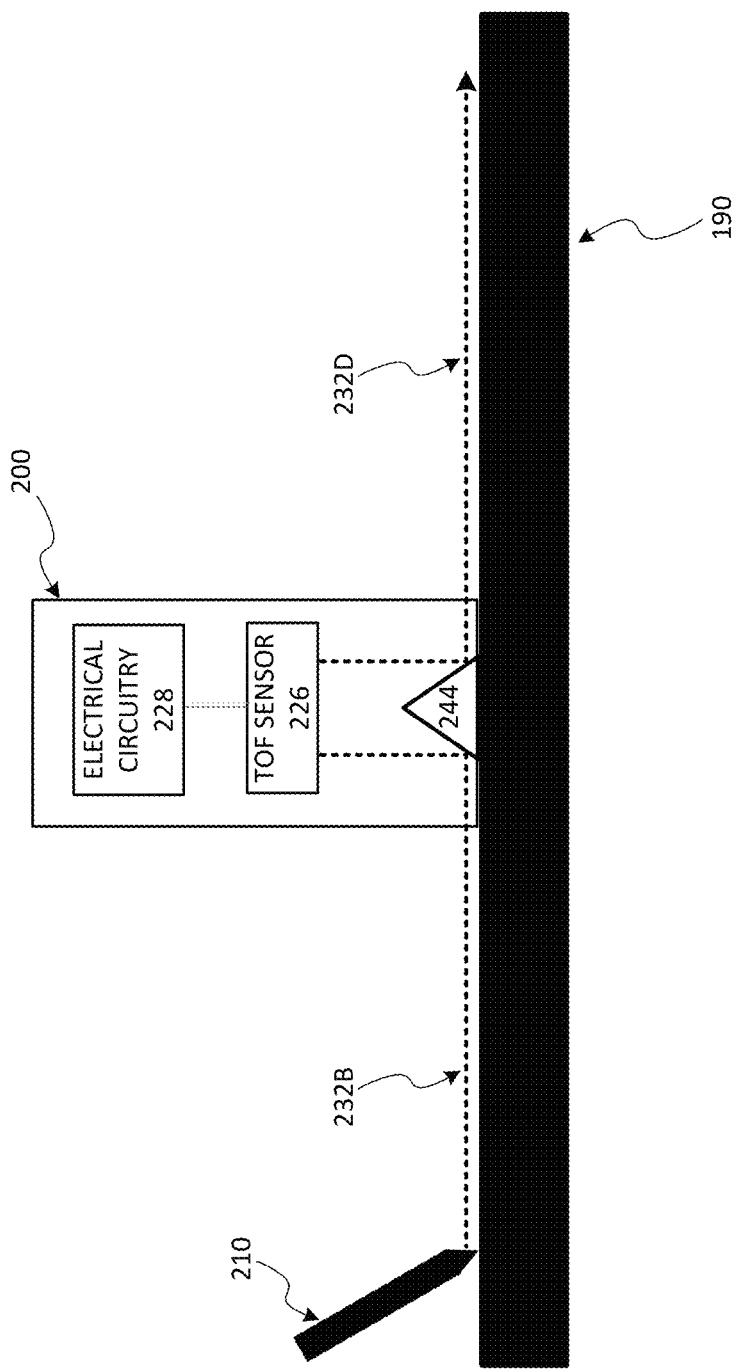
FIG. 2 illustrates use of an apparatus for determining a location of an object on a planar surface.

FIG. 2 illustrates use of apparatus 200 for determining a location of stylus 210 on planar surface 190. Apparatus 200 includes electrical circuitry 228, TOF sensor 226, and reflector 244.

Electrical circuitry 228 may include electrical and/or electronic components for communicating with TOF sensor 226 and, in some cases, for communicating with other devices. Electrical circuitry 228 may include digital components, analog components, electromechanical devices, connectors, or a combination thereof. In some cases, electrical circuitry 228 may also include one or more computer processors, microcontrollers, digital signal processors, programmable logic arrays, and/or programmable logic devices. In some cases, electrical circuitry 228 may also contain firmware, software, and/or another type of machine-readable instruction that is executable by the electrical hardware. In addition to receiving data from TOF sensor 226, electrical circuitry 228 may transmit data to TOF sensor 226. Electrical circuitry 228 may also include other communication capabilities, including the capability to communicate with other devices.

Stylus 210 is any object that a user may use to make pointing or writing motions on planar surface 190. Stylus 210 is an example of object 110 of FIG. 1.

Reflector 244 is any device for reflecting the field of view of TOF sensor 226 in a plurality of directions across planar surface 190. In one example, reflector 244 may be a conical mirror that reflects the field of view of TOF sensor 226 radially from reflector 244. TOF sensor 226 may be an area image sensor that is positioned with respect to reflector 244 such that the field of view of TOF sensor 226 in a plurality of directions and indicated by optical paths 232B and 232D. Although only two optical paths are illustrated in FIG. 2 for purposes of clarity, the field of view may be reflected in a larger number of directions as illustrated in FIG. 1. Optical paths 232B and 232D may be examples of optical paths 132B and 132D of FIG. 1.

Reflector 244 may also have a shape that is more complex than a simple conical shape in order to accomplish particular optical objectives or effects. For example, reflector 244 may be a conical aspheric mirror.

Using reflector 244, the field of view of TOF sensor 226 is transformed to a view across planar surface 190 in multiple directions. Consequently, a single image from TOF sensor 226 may include views in multiple radial directions from the axis of reflector 244 (i.e., a panoramic image across planar surface 190 from the perspective of reflector 244) without moving TOF sensor 226, without moving reflector 244, without moving apparatus 200, and without actively sweeping a beam, optical path, or field of view. An image capturing surface of TOF sensor 226 may be perpendicular to an axis of reflector 244. However, the spatial relationship does not need to be exactly perpendicular and may be about perpendicular, near perpendicular, or substantially perpendicular. Similarly, the image capturing surface of TOF sensor 226 may be parallel, about parallel, near parallel, or substantially parallel to planar surface 190. In other examples, additional optical components may be used to perform manipulation of the field of view of TOF sensor 226. In these cases, the perpendicular and/or parallel spatial relationships between the various elements described above may not be required. In one example, a telecentric optical element may be positioned in an optical path between TOF sensor 226 and reflector 244.

In operation, apparatus 200 captures a ranged image using TOF sensor 226. The ranged image includes a view across planar surface 190 in a plurality of radial directions from reflector 244. A portion of the image represented by optical path 232B includes a view of stylus 210 in contact with planar surface 190. The ranged image is processed to determine the position of the stylus on planar surface 190 by determining an angle and a distance of stylus 210 from an axis of reflector 244. The distance determination is possible because the ranged image includes distance information. The determinations of angle and distance may include one or more mathematical corrections for optical characteristics or behaviors of apparatus and may include one or more mathematical corrections for a distance between TOF sensor 226 and reflector 244. Successive images are captured by TOF sensor 226 to determine when stylus 210 moves to another location, when stylus 210 is removed from planar surface 190, and/or when one or more additional objects are placed on or near planar surface 190.

Although TOF sensor 226 is described as capturing both image and range information, separate devices may be used to capture these two types of information with electrical circuitry 228 combining the information to make the location determination using the techniques described herein.

Figure 3:
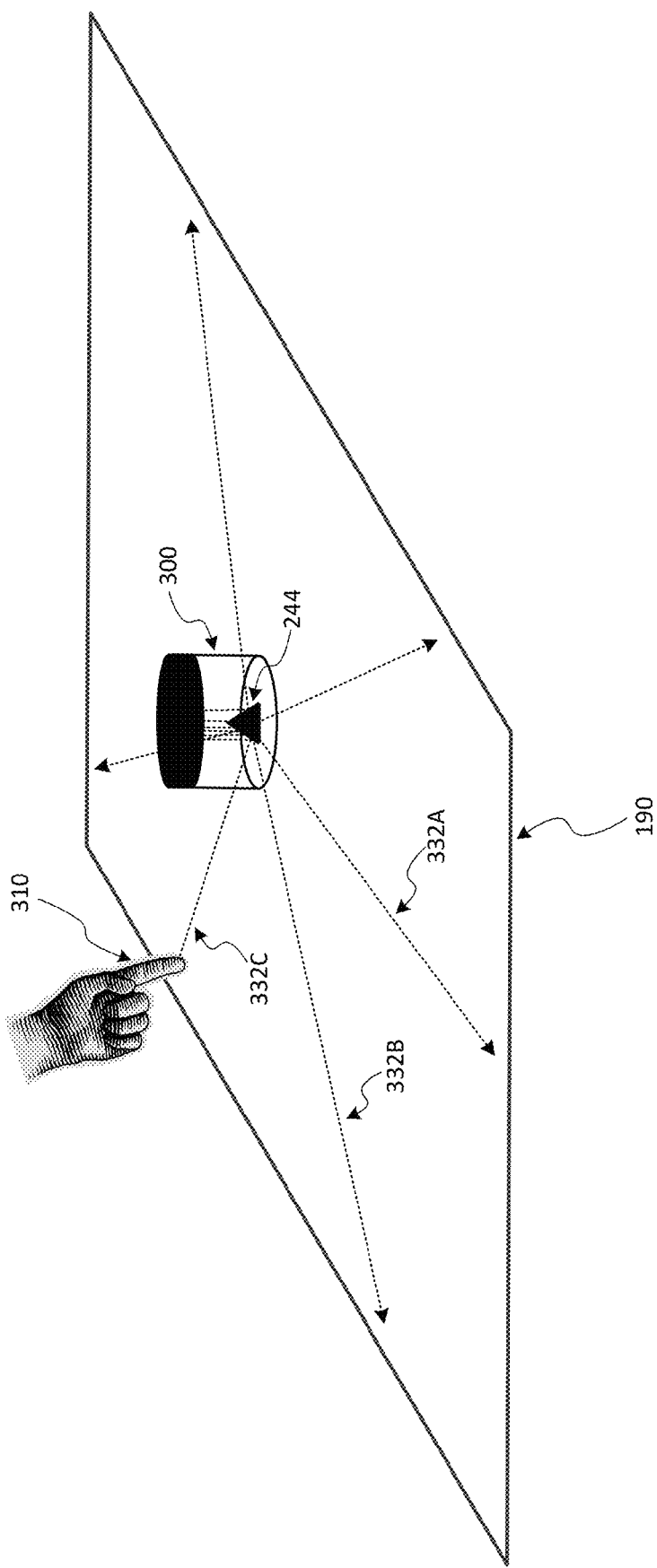
FIG. 3 illustrates use of an electronic whiteboard module for determining a location of an object on a planar surface.

FIG. 3 illustrates use of electronic whiteboard module 300 for determining a location of a finger 310 on planar surface 190. A user of electronic whiteboard module 300 "writes" on planar surface 190 using his or her hand. The user does not actually need to make any markings on planar surface. Electronic whiteboard module 300 operates similarly to PDM 122 and/or apparatus 200.

Electronic whiteboard module 300 includes a TOF sensor array and a reflecting device which reflects the field of view of the TOF sensor across planar surface in a plurality of directions as indicated by optical paths 332A, 332B, and 332C. This redirection of the field of view is accomplished using a reflective device. As in previous examples, the field of view may be continuous across planar surface 190, or portions of planar surface 190, and is illustrated as discrete optical paths for purposes of explanation only. Electronic whiteboard module 300, from a stationary position, captures one or more range images including information from the plurality of directions. The range image(s) are captured without the TOF sensor or the reflective device moving within electronic whiteboard module 300 and without the TOF sensor or the reflective device moving with respect to each other. In some implementations, more than one TOF sensor and/or more than one reflective device may be used. In addition, other optical components may be used to further direct, collimate, steer, correct, compensate, or adjust the field of view of the TOF sensor.

Electronic whiteboard module 300 may include additional components such as a power supply, a battery, a power switch, a status indicator, and/or one or more components for communicating with another device, such as a computer or an electronic display. Communication with other devices is discussed in greater detail with respect to FIG. 7.

In FIG. 3, electronic whiteboard module 300 determines a position of finger 310 on planar surface 190 using the portion of a range image captured through optical path 332C. A distance of finger 310 from electronic whiteboard module 300 is determined based on distance information included in the range image. An angular position of finger 310 relative to electronic whiteboard module 300 is also determined based on the range image. Using the determined distance and angle information, a relative location of finger 310 on planar surface 190 can be mathematically determined. The mathematical determination of the location may be performed by electronic whiteboard module 300 or may be performed by another device to which electronic whiteboard module 300 passes raw or partially processed data regarding a position of finger 310 within the field of view.

Figure 4:
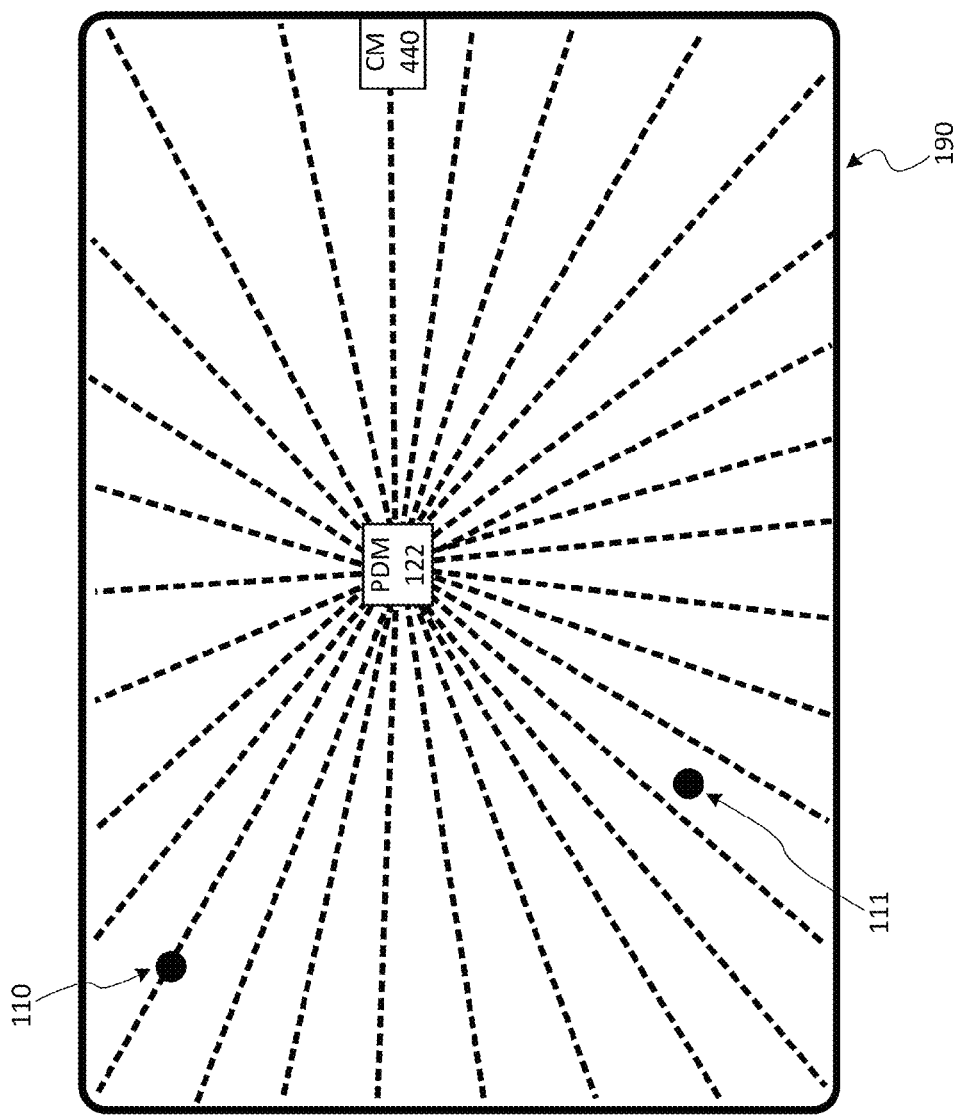
FIG. 4 illustrates operation of an apparatus for determining location of objects on a planar surface.

FIG. 4 illustrates operation of PDM 122 for determining a location of object 110 and object 111 on planar surface 190. PDM 122 determines the location of object 110 using the techniques described herein. Using similar techniques, PDM 122 may also determine a location of additional objects on planar surface 190, such as object 111. Object 111 is also any object that a user may use to make pointing or writing motions on planar surface 190. Object 111 may be a finger, a stylus, a pointer, a pen, a marker, or another object having a tip or end discernible in images or image information captured by PDM 122.

Because the optical path of PDM 122 is directed across planar surface 190 in a plurality of directions, simultaneously, a single range image captured by PDM 122 may include object 110 and object 111. Image processing algorithms may be used to identify physical differences between object 110 and object 111 in order to individually identify them and track their individual movements over time. In one example, object 110 and object 111 are styluses with tips having different shapes. These different shapes are captured in the range images captured by PDM 122 such that movements of the two styluses can be separately tracked.

The techniques disclosed herein may also benefit from one or more calibration processes to improve the accuracy with which PDM 122 determines the locations of objects. In one example of calibration, calibration module (CM) 440 is an object with a known physical location relative to PDM 122. CM 440 is captured in a range image and a location of CM 440 is identified in a manner similar to that discussed with respect to object 110 and/or object 111. Then, mathematical corrections are identified based on differences between the determined location of CM 440 and the known location of CM 440.

In other cases, CM 440 may be a device that actively communicates with PDM 122 as part of a calibration process. For example, if the distance between PDM 122 and CM 440 is not initially known, an optical signal may be transmitted between PDM 122 and CM 440. By measuring the time taken for the optical signal to reach the destination, the distance between the two devices may be determined. PDM 122 can then use the resulting calibration information to better utilize the range information obtained from the range images.

Objects 110 and 111 may be associated with different users or may be representative of markers of two different colors used by a single user. In another example, two or more objects on a planar surface may be the fingers of different users who are writing on the planar surface. Image processing algorithms may be used to distinguish between the fingers of different users based on physical differences such as finger size, finger structure, jewelry, and/or skin color. In some cases, the users may wear unique finger tips, thimbles, or rings that have different physical structures or characteristics that can be viewed and distinguished through image processing.

In another example, the objects are styluses or pointers that actively transmit or emit data enabling them to be distinguished by electrical circuitry receiving the transmitted data. The electrical circuitry may be included in PDM 122 or may be in another device. The transmission may include transmitting an optical signal or information, transmitting information using an infrared signal, transmitting a radio frequency (RF) signal, transmitting through a wired connection, or a combination thereof. The objects may be distinguished based on the type of transmission and/or based on the data included in the transmission.

In the case that planar surface 190 is a surface of an electronic display device, the locations and/or movements of the objects may be displayed on the electronic display in real-time, or near real-time, as the objects are moved on the surface. In some situations, the movement, path, or writing motion, of each of the objects may be displayed in a different color or displayed in a contrasting manner using some other distinguishing characteristic. This information may be displayed in addition to other information presented on the display, as discussed in examples herein.

Duplicating a writing motion that has been made using an object on a surface may also include determining when the object is actually in contact with the surface versus hovering slightly above the surface. Determining when the object is in contact with the surface may be important in generating electronic information that reflects the writing that a user of the object intended. Determining when the object is in contact with the surface, or sufficiently near the surface to be interpreted or understood as being in contact with the surface, may be accomplished using one or more of the techniques discussed below.

In one example, an imaging sensor, such as TOF sensor 226, has sufficient optical resolution to capture images that can be processed to determine whether an object is in contact with a surface. In the case of a deformable object, such as a fingertip of a user, this may be accomplished by successively processing images of the finger to detect a change in a shape of the tip of the finger as it is pressed against the surface. Other types of deformable objects or styluses are possible.

In another example, the object is a stylus containing a switch at its tip that is activated when the stylus is pressed against a surface. The stylus may transmit a signal to another component of the system indicating when the switch is or is not triggered.

In another example, the stylus may contain a proximity sensor at its tip that indicates when the stylus is within a specified distance of a surface.

In yet another example, the object may be a stylus that contains a switch that is activated by the user. The operation of the stylus may be dependent upon the user activating the switch when the stylus is intended to be "writing." In this implementation, the stylus could be used without actually pressing it against a surface. In other words, the user could use the stylus to write in free space and use the switch to indicate when the stylus should be active and when it should not.

A stylus may also be configured to detect how hard a user is pressing the stylus against a surface. This information may be used in determining characteristics of an electronic representation of the user's writing. For example, when a user presses harder on the stylus, a line width of the electronically generated line may increase to visually represent that action. This may be accomplished in a number of ways. In one approach, the stylus may include a spring loaded tip that depresses in proportion to the amount of force applied to the stylus against the surface. A sensor, such as a hall effect sensor, may be used to detect how far the tip has been depressed into the stylus. Alternately, a strain gauge or other type of spring mechanism or pressure sensor may be used to determine how much force is being applied to the stylus by the user.

Figure 5:
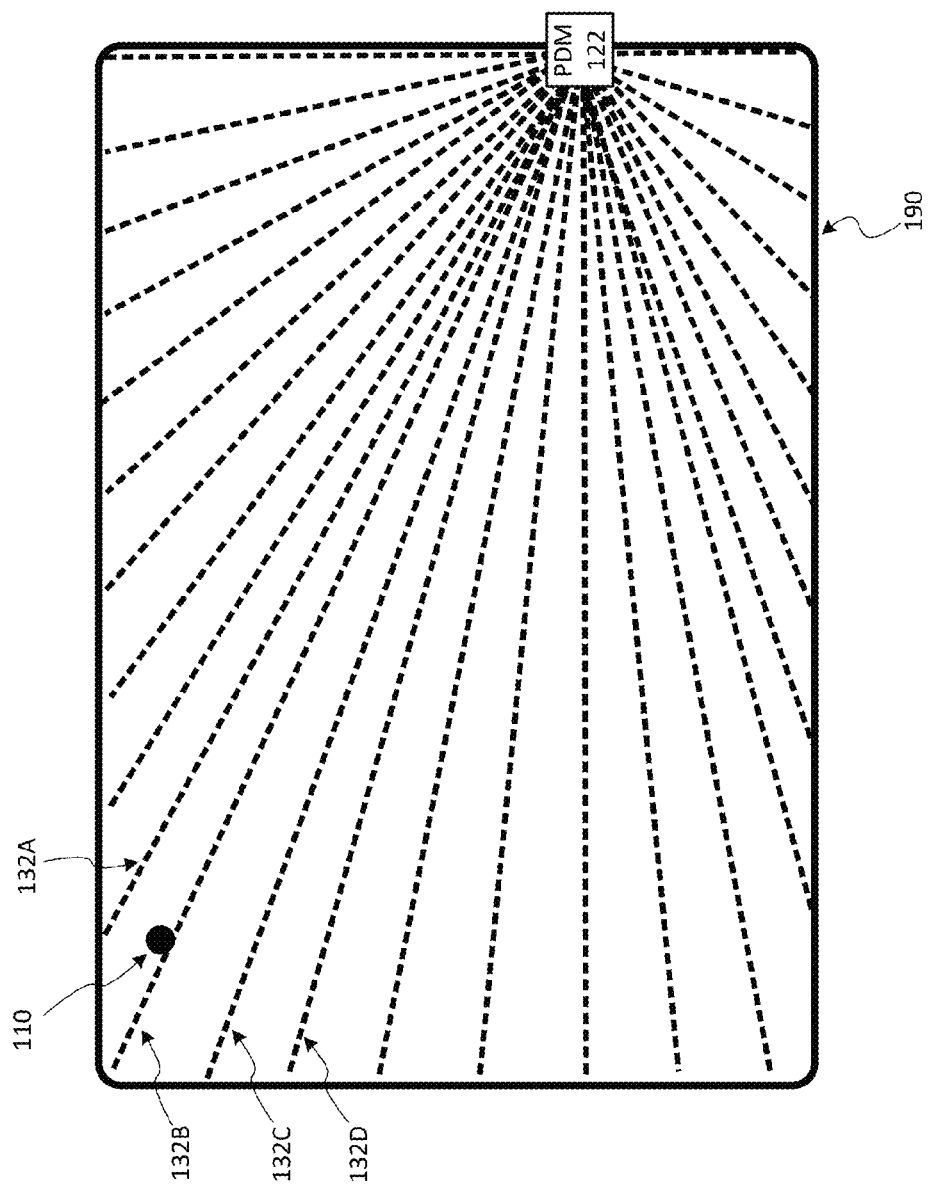
FIG. 5 illustrates operation from a different location of an apparatus for determining a location of an object.

FIG. 5 illustrates a variation of the operation illustrated in FIG. 1. In FIG. 5, PDM 122 is operated from a location other than a center of planar surface 190. In the example of FIG. 5, PDM 122 is configured to capture an approximately 180 degree field of view across planar surface 190. Other configurations may include capturing a field of view of anywhere between 0 and 360 degrees. PDM 122 may be permanently configured to capture only a specified field of view or the field of view may be reconfigurable. In some cases, a TOF sensor and a reflecting device in PDM 122 may be repositioned with respect to each other to change the range of the field of view. In other cases, PDM 122 may be capable of optically capturing a 360 degree field of view but may only store and process information associated with one or more smaller portions of that 360 degree field of view. For example, a square TOF sensor positioned perpendicular to an axis of a conical mirror such that a corner of the TOF sensor is aligned with the axis of the conical mirror will capture an approximately 90 degree field of view because the TOF sensor will be capturing images reflected through approximately one quarter of the circumference of the conical mirror.

Figure 6:
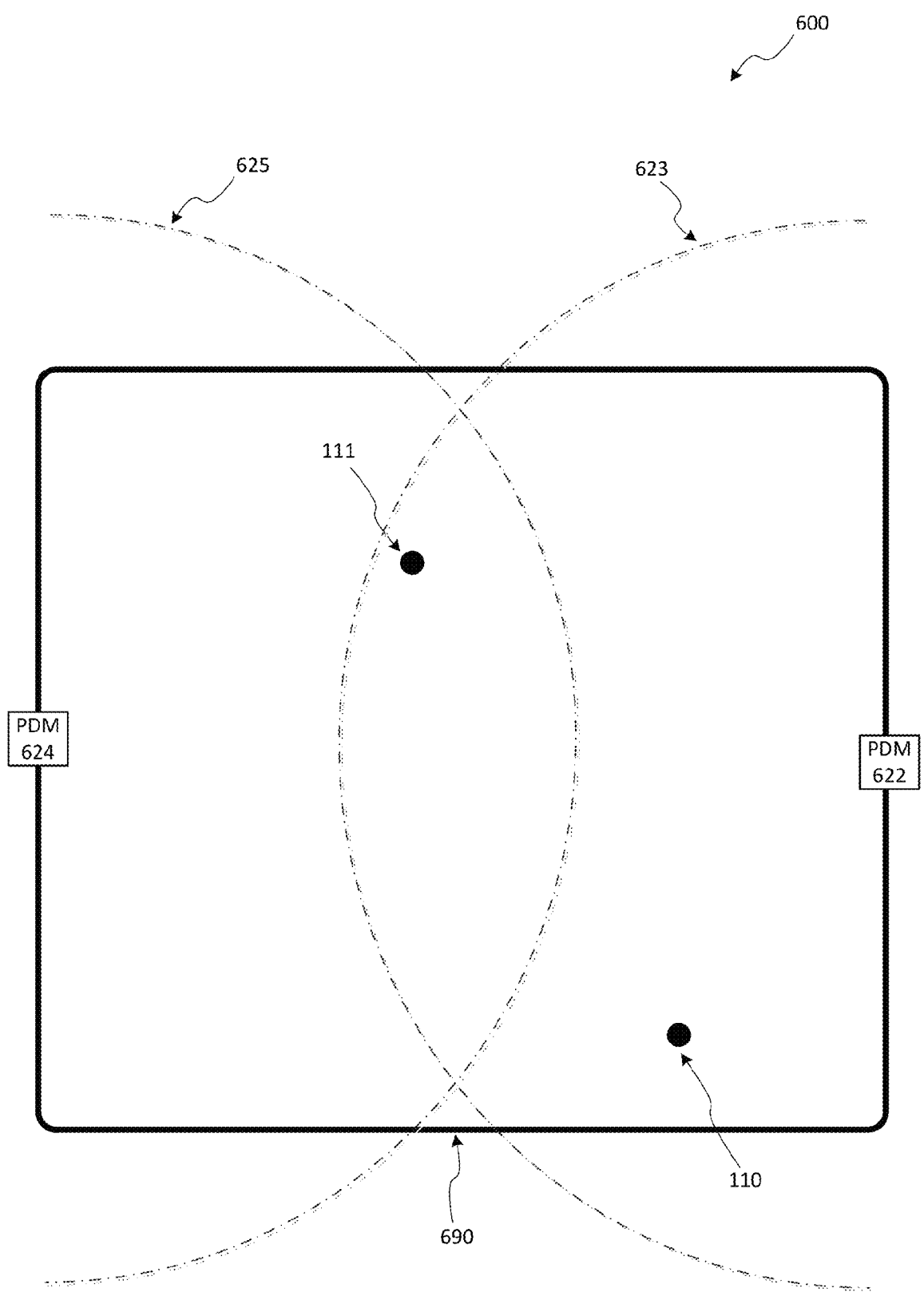
FIG. 6 illustrates a system for determining a location of objects on a planar surface.

FIG. 6 illustrates system 600 for determining a location of object 110 on planar surface 690. System 600 includes two position determining modules, PDM 622 and PDM 624. Each of PDM 622 and PDM 624 are examples of PDM 122, apparatus 200, and/or electronic whiteboard module 300. PDM 622 and PDM 624 are each capable of determining a location of an object using one or more of the techniques described herein. However, due to optical resolution or other limitations, each of PDM 622 and 624 may only be capable of accurately determining a location of an object up to a specified range or distance away.

In the example of FIG. 6, range 623 is associated with PDM 622 and indicates a maximum distance from which PDM 622 can determine a location of an object or a maximum distance from which PDM 622 can accurately or reliably determine a distance of an object. Similarly, range 625 is associated with PDM 624. Ranges 623 and 625 are not tangible boundaries or objects and are illustrated in FIG. 6 only for purposes of describing the capabilities of the PDMs. Although other shapes are possible, ranges 623 and 625 will typically be of a circular or arc-like shape because the field of view is being reflected out radially from the respective PDM. Depending on the optical characteristics of the PDM, other range shapes are also possible.

PDM 622 and PDM 624 may be used together to determine locations of one or more objects on a planar surface, such as planar surface 690, having an area that is larger than can be adequately covered by either of the PDMs individually. In other situations, one of the PDMs may be capable of covering the entire area of interest, but a second PDM may be used to improve accuracy, improve response time, and/or for purposes of redundancy. The ranges of the PDMs may overlap more or overlap less than is illustrated in FIG. 6. The PDMs may be in different locations relative to planar surface 690 than is illustrated in FIG. 6. In some cases, more than two PDMs may be used in combination to determine locations of objects on a planar surface.

In the example of FIG. 6, information from PDM 622 and PDM 624 may be combined in order to identify locations of one or more objects across all or most of planar surface 690. Object 110 is within the range of PDM 622 because it is within range 623. In contrast, object 111 is within range of both PDM 622 and PDM 624. Because it is closer to PDM 624, only information from PDM 624 may be used to determine and/or indicate a position of object 111. Alternately, both PDM 622 and PDM 624 may collect information regarding object 111, and both sets of information may be used to determine the location of object 111. In some cases, using information from both PDMs may result in a more accurate determination of the location of object 111.

Figure 7:
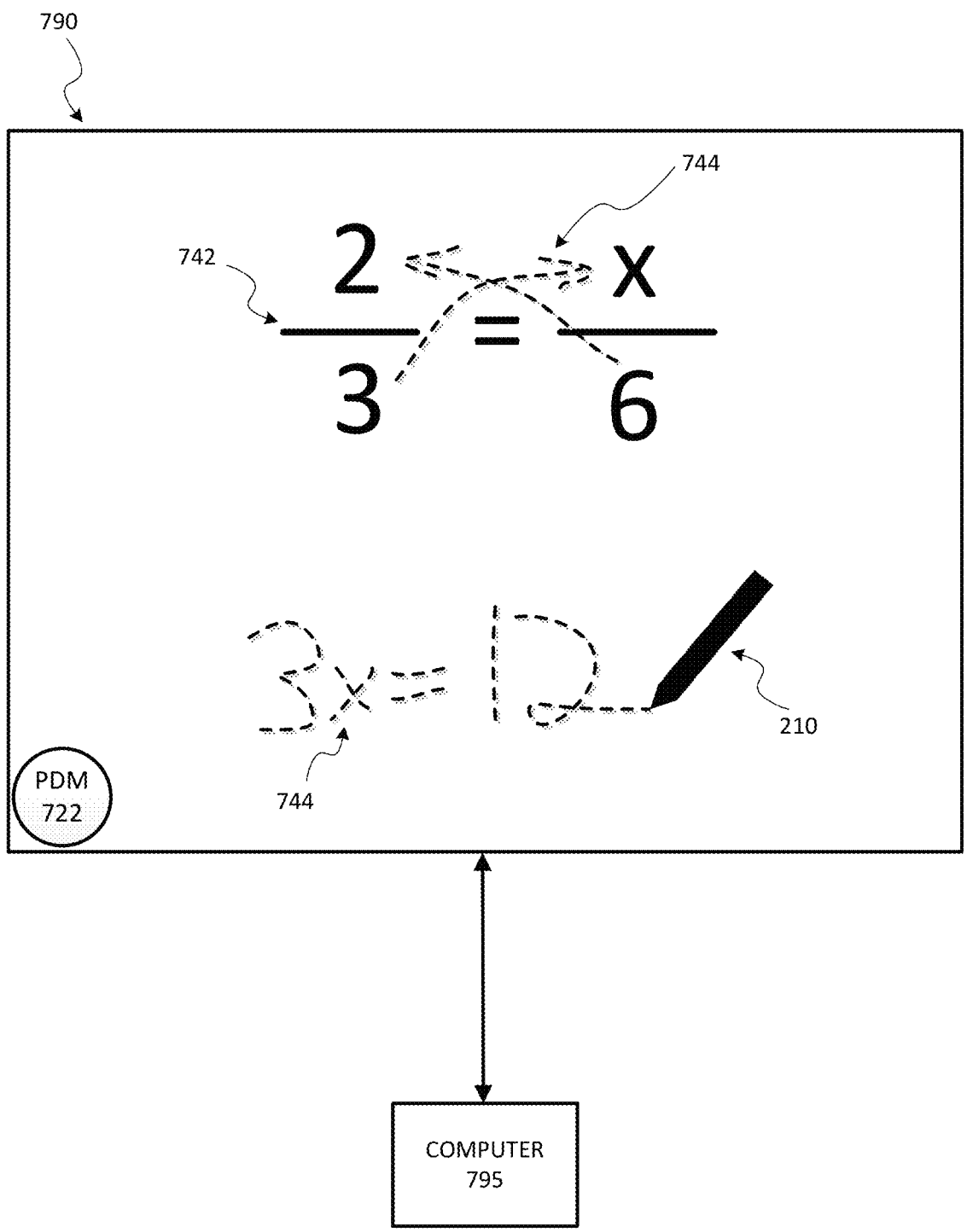
FIG. 7 illustrates operation of a position determining module with an electronic display.

FIG. 7 illustrates operation of a PDM 722 in conjunction with an electronic display 790. PDM 722 is an example of PDM 122, apparatus 200, electronic whiteboard module 300, PDM 622, and/or PDM 624. Electronic display 790 may be any kind of information display device such as: a liquid crystal display (LCD), a plasma display, a cathode ray tube, an electrophoretic ink panel, and/or information projected on a surface by an electronic device, such as a projector. Display 790 does not include an integrated touch sensitive screen or touch sensitive panel.

Computer 795 controls the information displayed on display 790. Computer 795 may be any type of computing device such as a desktop computer, a notebook computer, a tablet computer, a smartphone, a server, a virtual machine, an application specific integrated circuit (ASIC), a video display controller, an analog computer, a group of computing devices, or a combination thereof. In one example, computer 795 is a notebook computer and display 790 is an LCD display for displaying information to a group of people, such as students in a classroom. Computer 795 commands display 790 to display information such as text 742 (non-broken lines) using known methods.

PDM 722 may be temporarily or permanently affixed to the surface of display 790. In cases where the surface of display 790 is horizontal, or near horizontal, PDM 722 may simply be set or placed onto the surface of display 790. PDM 722 determines the location of stylus 210 using one or more of the techniques described herein. PDM 722 repeatedly determines the position of stylus 210 on the surface of display 790 as a user of stylus 210 "writes" on the surface of display 790 with stylus 210. The successively determined locations of stylus 210 on display 790 may be communicated to computer 795 as stylus 210 is moved across the surface. In other words, the locations may be transferred from PDM 722 to computer 795 as they are determined rather than waiting for the writing action to be complete. PDM 722 may communicate with computer 795 using wired or wireless methods of communication. PDM 722 may also be powered using an included battery, or other internal power source. In some cases, PDM 722 may be operated as a self-contained unit that can be operated without being attached to other devices using wires or cables.

In FIG. 7, PDM 722 is positioned near a corner of display 790. Consequently PDM 722 may be configured to capture a field of view of only approximately 90 degrees such that the field of view covers, or approximately covers, the surface area of display 790. The span of the field of view of PDM 722 may be fixed or may be configurable. In the case that the span of the field of view is configurable, it may be configured by direct interaction with PDM 722 or may be configured using computer 795. In the latter case, computer 795 may include software for configuring and/or otherwise interfacing with PDM 722.

Computer 795 processes the information received from PDM 722 and displays this information in the form of text 744. Although displayed electronically, text 744 is intended to mimic the physical movement of stylus 210 on the surface of display 790 as if stylus 210 was physically marking on the surface of display 790 using traditional methods. Text 744 is illustrated using broken lines for purposes of explanation and for purposes of contrast with text 742. However, text 744 will typically be displayed as continuous lines, to the extent determined by PDM 722, rather than with broken lines. Text 744 may be displayed in a color that is different than a color of text 742 for purposes of contrast between the existing text and the text the user has added. Adding newly written information to existing information can be very useful for purposes of presentation, instruction, and other types of communication using electronic means.

PDM 722 enables an electronic display, such as display 790, which does not have touchscreen or electronic whiteboard capabilities, to be adapted to function as if it has touchscreen capabilities. Using the techniques disclosed herein, this is accomplished using a relatively low cost attachment, such as PDM 722. Computer 795 may also store text 744 in an electronic file for later use, including adding text 744 to the original file which contained text 742 and/or create a new file that includes both text 742 or text 744. Once computer 795 is configured to display the information received from PDM 722, in addition to the information typically displayed by computer 795, this electronic whiteboard capability may be used with many different software programs and applications.

In one variation of the examples herein, electrical, electronic, and/or electrostatic methods may be used to determine when there is contact between an object and a planar surface. In other words, the techniques described herein may be used to optically determine the location of a finger or stylus on or near a surface without optically determining whether contact is being made. Then, the electrical, electronic, and/or electrostatic contact information is used in conjunction with the optical information to implement an electronic whiteboard or virtual writing surface. While this approach may require some type of touch-sensing capability to be implemented on the writing surface, this solution can, nonetheless, be more cost effective than a traditional touchscreen panel because this implementation does not require that the touch-sensing features be capable of detecting or indicating where on the surface contact has been made, it simply requires an indication that contact has been made somewhere on the surface. The location of contact on the surface is still determined using the techniques described herein.

Figure 8:
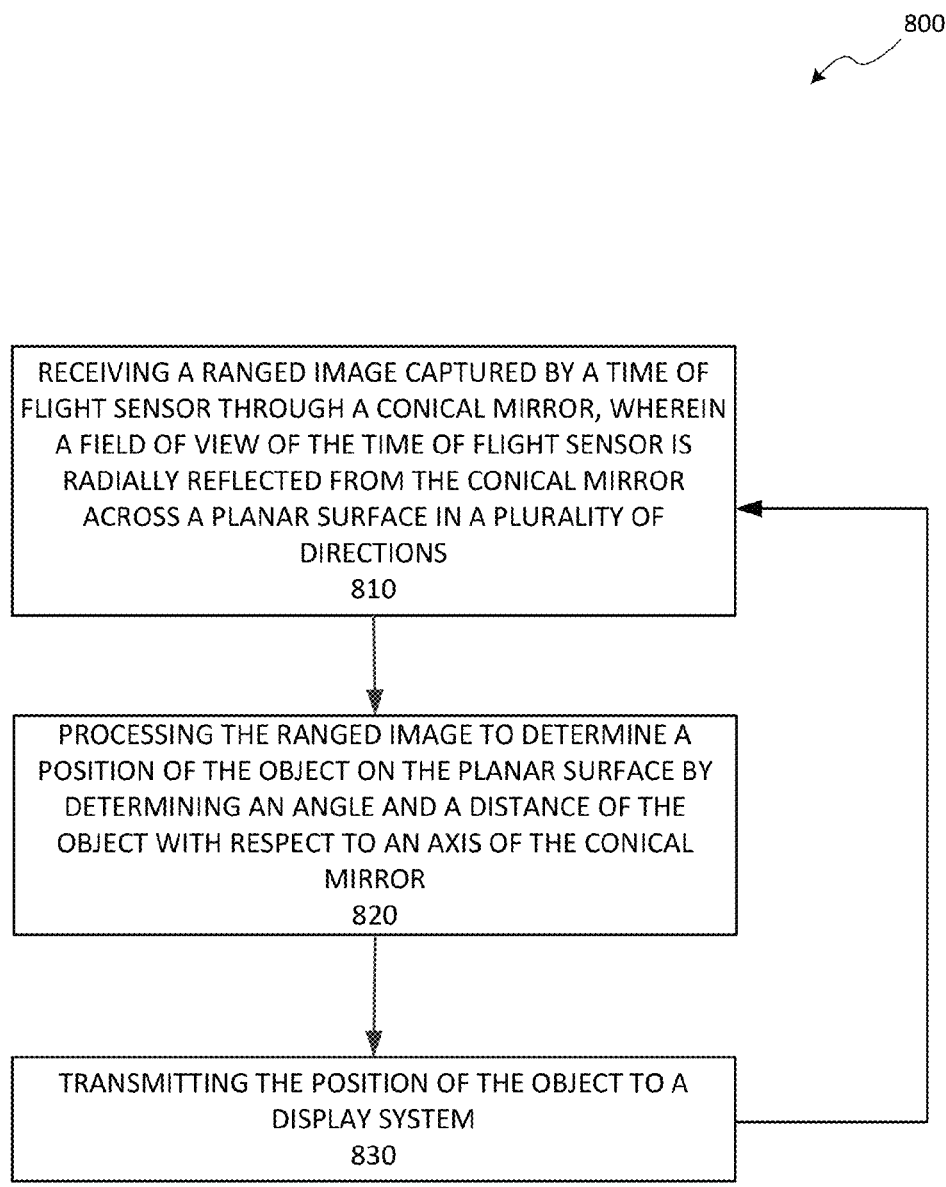
FIG. 8 illustrates a method of operating a system for determining a location of an object on a planar surface.

FIG. 8 illustrates method 800 of operating a system for determining a location of an object on a planar surface. At step 810, method 800 includes receiving a ranged image captured by a TOF sensor through a conical mirror. The ranged image is captured from a field of view of the TOF sensor that is radially reflected from the conical mirror across the planar surface in multiple directions. At step 820, the method includes processing the ranged image to determine the position of the object on the planar surface by determining an angle and a distance of the object relative to an axis of the conical mirror. At step 830, the method includes transmitting the position of the object to a display system. Many variations of this method are possible as described in the other examples provided herein.

Figure 9:
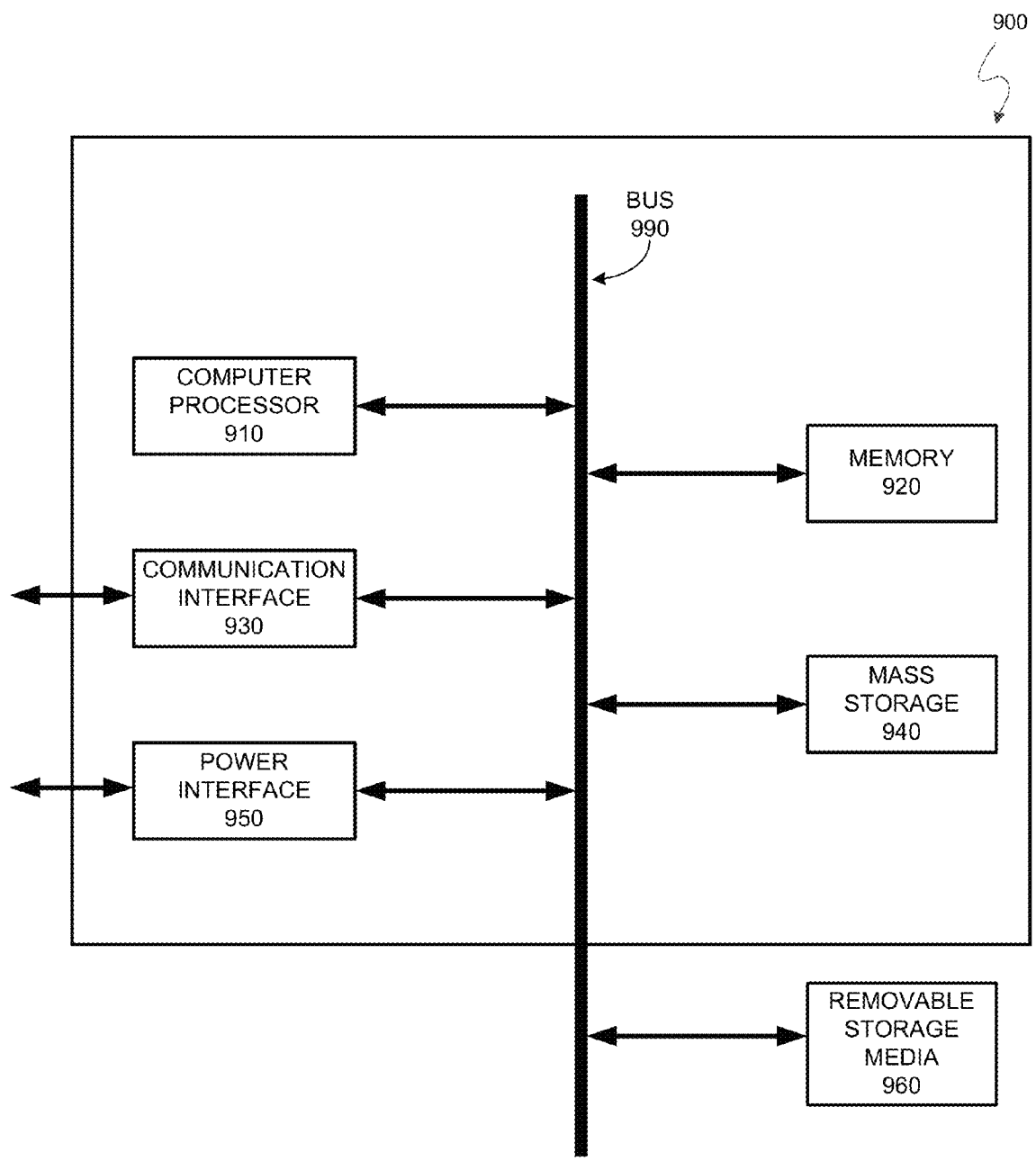
FIG. 9 illustrates a computing system that may be used in determining a location of a stylus on a planar surface.

FIG. 9 illustrates computer system 900 with which some embodiments of the techniques disclosed herein may be implemented or utilized. A computing system, such as computing system 900, may be used to implement functions of electrical circuitry 228, PDM 122, electronic whiteboard module 300, PDM 622, PDM 624, PDM 722, and/or computer 795.

According to the example of FIG. 9, computer system 900 includes a bus 990, at least one computer processor 910, at least one communication interface 930, at least one memory 920, at least one mass storage device or module 940, and at least one power interface 950. A removable storage media 960 may also interface to bus 990 of computer system 900.

Computer processor 910 can be any known computer processor, central processing unit, microprocessor, microcontroller, programmable logic array, or programmable logic device. Computer processor 910 may also interface to a coprocessor.

Communication interface 930 can be any type of interface for communicating with another device or a network. Communication interface 930 may be configured for communicating using a wired connection, a wireless connection, audio signals, light waves, infrared, or a combination thereof. Communication interface 930 may be configured for communicating with or over a network such a Local Area Network (LAN), Wide Area Network (WAN), or any network to which computer system 900 connects. Communication interface 930 may also be configured to communicate with an electronic device such as a cellular phone, a smartphone, a tablet, a laptop computer, a server, or a digital audio device. The various functions of communication interface 930 may be distributed across multiple communication interfaces. In one example, communication interface 930 is a USB interface.

Memory 920 can include random access memory (RAM), or any other type of dynamic data storage device commonly known in the art. Memory 920 may also include one or more static storage devices such as read only memory (ROM), programmable read only memory (PROM), flash memory, magnetic memory, erasable programmable read only memory (EPROM), and/or electrically erasable programmable read only memory (EEPROM) for storing static data such as firmware or machine-executable instructions for computer processor 910 or for another computer processor.

Mass storage 940 can include one or more persistent mass data storage devices or modules that may be used to store data, information, and/or instructions. Mass storage 940 may include a hard drive, a tape drive, an optical drive, flash memory, a micro electromechanical storage device, or a combination thereof.

Power interface 950 can be any type of interface for receiving and/or transmitting electrical power. The functions of power interface 950 may be spread across multiple power interfaces. Power interface 950 may include a battery and may interface to external devices for purposes of charging the battery. The functions of power interface 950 may also be combined into a single connector and/or interface with communication interface 930. For example, the functions of communication interface 930 and power interface 950 may both be implemented in the form of one or more USB interfaces.

Removable storage media 960 can be any kind of external data storage device including a hard drive, a memory card, a subscriber identity module (SIM) card, flash memory, an optical drive, a tape drive, a micro electromechanical storage device, or a combination thereof.

Bus 990 communicatively couples the elements of computer system 900, as well as removable storage media 960. Bus 990 may conform to an industry standard bus architecture and protocol or may use a proprietary architecture and/or protocol.

Some or all of the steps and operations associated with the techniques introduced here may be performed by hardware components or may be embodied in machine-executable instructions that cause a general purpose or special purpose computer processor programmed with the instructions to perform the steps. Alternatively, the steps may be performed by a combination of hardware, software, and/or firmware.

The apparatuses, systems, methods, and components described herein are meant to exemplify some types of possibilities. In no way should the aforementioned examples limit the scope of the invention, as they are only exemplary embodiments.

The foregoing disclosure has been presented for purposes of illustration and description. Other modifications and variations may be possible in view of the above teachings. The examples described in the foregoing disclosure were chosen to explain the principles of the concept and its practical application to enable others skilled in the art to best utilize the invention. It is intended that the claims be construed to include other alternative embodiments of the invention except as limited by the prior art.

The phrases "in some embodiments," "according to some embodiments," "in the embodiments shown," "in other embodiments," "in some examples," "in some cases," "in some situations," "in one configuration," "in another configuration" and the like generally mean that the particular feature, structure, or characteristic following the phrase is included in at least one embodiment of the present invention and/or may be included in more than one embodiment of the present invention. In addition, such phrases do not necessarily refer to the same embodiments or different embodiments.

What is claimed is:

1. An apparatus for determining a position of an object on a planar surface, the apparatus comprising:
   a conical mirror having an axis that is about perpendicular to a planar surface;
   a time-of-flight sensor array positioned at one location relative to the planar surface, the one location having a spatial relationship to the conical mirror such that a field of view of the time-of-flight sensor array is reflected radially from the conical mirror in a plurality of directions across the planar surface, wherein the apparatus does not include a second time-of-flight sensor array; and
   electrical circuitry configured to:
      receive a plurality of ranged images captured by the time-of-flight sensor array through the conical mirror, the ranged images including the object;
      process the plurality of ranged images to detect a deformation of the object resulting from the object coming into contact with the planar surface, the deformation of the object detected based on both intensity information and distance information included in each of the ranged images captured by the time-of-flight sensor array from the one location;
      in response to the detected deformation of the object, process one or more of the ranged images to determine the position of the object on the planar surface by determining an angle and a radius of the position of the object relative to the axis of the conical mirror;
      process one or more of the ranged images to detect a physical characteristic of the object and associate a display color with the object based on the detected characteristic; and
      transmit the position of the object and the color to a display system.

2. The apparatus of claim 1 wherein the intensity information and distance information included in each of the ranged images includes intensity information and distance information associated with each of two or more of a plurality of pixels of the time-of-flight sensor array.

3. The apparatus of claim 1 wherein the time-of-flight sensor array is positioned with respect to the axis of the conical mirror such that the ranged images include at least a one hundred eighty degree area of the planar surface with respect to the axis of the conical mirror.

4. The apparatus of claim 1 further comprising a battery configured to power the time-of-flight sensor array and the electrical circuitry.

5. The apparatus of claim 1 wherein the time-of-flight sensor array includes a radio frequency modulated light source and a phase detector.

6. The apparatus of claim 1 wherein the time-of-flight sensor array includes a pulsed light source and a shutter synchronized with the pulsed light source.

7. The apparatus of claim 1 further comprising a telecentric optical element positioned in an optical path between the time-of-flight sensor array and the conical mirror.

8. The apparatus of claim 1 wherein the conical mirror is a conical aspheric mirror.

9. The apparatus of claim 1 wherein the electrical circuitry is further configured to process the ranged images to identify a characteristic of a holder of the object.

10. The apparatus of claim 1 wherein the electrical circuitry is further configured to process the ranged images to determine a position of a second object on the planar surface.

11. A method for determining a position of an object on a planar surface, the method comprising:
   receiving a series of ranged images captured by a single time of flight sensor through a conical reflector, wherein the time of flight sensor is positioned at one location and a field of view of the time of flight sensor is radially reflected from the conical reflector across the planar surface in a plurality of directions, wherein a second time of flight sensor is not used in the method;

processing the series of ranged images captured from the one location to detect a deformation of the object resulting from the object contacting the planar surface, wherein each ranged image of the series includes intensity and distance information;

processing one or more of the ranged images to determine the position of the object on the planar surface in response to detecting the deformation by determining an angle and a distance of the object with respect to an axis of the conical reflector;

processing one or more of the ranged images to detect a physical characteristic of the object to associate a parameter with the object; and transmitting the position of the object and the parameter to a display system.

12. The method of claim 11 wherein the time of flight sensor is positioned with respect to the axis of the conical reflector such that the ranged images include at least a one hundred eighty degree area of the planar surface with respect to the axis of the conical reflector.

13. The method of claim 11 further comprising positioning a telecentric optical element in a path between the time of flight sensor and the conical reflector.

14. The method of claim 11 further comprising processing the series of ranged images to identify a characteristic of a holder of the object.

15. The method of claim 11 further comprising processing the series of ranged images to determine a position of a second object on the planar surface.

16. An information display system comprising:
an electronic display; and
a position determining unit including:
  a conical mirror;
  a time-of-flight sensor array positioned at a single location with respect to the conical mirror such that a field of view of the time-of-flight sensor array is reflected from the conical mirror in a plurality of directions across a surface of the electronic display, wherein the system does not include a second time-of-flight sensor array; and
one or more computer processors configured to:
  receive ranged images captured by the time-of-flight sensor array from the single location through the conical mirror;
  process the ranged images to determine a position of an object on the surface of the electronic display by determining an angle and a radius of the object relative to an axis of the conical mirror, wherein the object is determined to be on the surface based on a detected deformation of the object determined based on the ranged images;
  process the ranged images to detect a physical characteristic of the object and associate a color with the object based on the detected characteristic; and
  transmit the position of the object and the color associated with the object for display on the electronic display.

17. The information display system of claim 16 wherein the object comprises a finger of a user of the information display system.

18. The information display system of claim 16 wherein the object comprises a stylus having a deformable tip.

* * * * *